United States Patent
Oh et al.

(10) Patent No.: US 12,075,114 B2
(45) Date of Patent: Aug. 27, 2024

(54) CIRCUIT AND METHOD FOR LINK VERIFICATION BY HDCP RECEIVER

(71) Applicant: Intel Corporation, Santa Clara, CA (US)

(72) Inventors: Boon Hong Oh, Penang (MY); Yeong Liang Low, Perak (MY); Laila Ahmed Saad Ahmed Ahmed, Giza (EG)

(73) Assignee: Altera Corporation, San Jose, CA (US)

( * ) Notice: Subject to any disclaimer, the term of this patent is extended or adjusted under 35 U.S.C. 154(b) by 1009 days.

(21) Appl. No.: 16/729,028

(22) Filed: Dec. 27, 2019

(65) Prior Publication Data

US 2020/0134236 A1    Apr. 30, 2020

(51) Int. Cl.
  *H04N 21/4367* (2011.01)
  *H04N 5/05* (2006.01)
  *H04N 21/23* (2011.01)

(52) U.S. Cl.
  CPC .......... *H04N 21/4367* (2013.01); *H04N 5/05* (2013.01); *H04N 21/23* (2013.01)

(58) Field of Classification Search
  CPC ....... H04N 21/4367; H04N 21/23; H04N 5/05
  See application file for complete search history.

(56) References Cited

U.S. PATENT DOCUMENTS

| | | | |
|---|---|---|---|
| 8,120,706 B1* | 2/2012 | Verbeck | H04N 7/088 348/556 |
| 2013/0100349 A1* | 4/2013 | Look | H04N 5/44 348/558 |
| 2015/0020088 A1* | 1/2015 | Velasco | H04L 12/2838 725/116 |
| 2019/0278945 A1* | 9/2019 | Sugahara | G06F 21/755 |

* cited by examiner

*Primary Examiner* — Joshua D Taylor
(74) *Attorney, Agent, or Firm* — InventIQ Legal LLP

(57) ABSTRACT

A method for an audiovisual receiver to request an audiovisual transmitter to reset a communication link includes requesting the reset when the audiovisual receiver determines that the communication link is unlocked. The communication is determined to be unlocked when the active geometry of successive audiovisual frames transmitted from the transmitter to the receiver is determined by the receiver to be inconsistent. The communication is also determined to be unlocked when the interval between control bits of the successive audiovisual frames is inconsistent. When one or both of the inconsistencies is determined, the receiver sets an error bit in a register of the receiver that is accessible by the transmitter to determine from the receiver that the communication link is unlocked.

20 Claims, 12 Drawing Sheets

CIRCUIT AND METHOD FOR LINK VERIFICATION BY HDCP RECEIVER

FIELD OF THE DISCLOSURE

The present disclosure relates to a bitstream security circuit of a receiver where the receiver initiates a link reset in a transmitter when link verification is lost. More specifically, the present disclosure relates to a receiver configured in a configurable integrated circuit die that operates according to the high-bandwidth digital content protection (HDCP) protocol and initiates link reset in a transmitter that also operates according to the HDCP protocol.

BACKGROUND OF THE INVENTION

Audiovisual content is disseminated in digital form across the internet to displays and from players that use physical media to displays. The audiovisual content is susceptible to unauthorized use at various points along these transmission paths. As a result, content providers use various content protection schemes to prevent unauthorized use of content.

The HDCP protocol is a standard protocol typically used to protect content in the last stages of content distribution. HDCP protocol specifies the encryption of audiovisual content transmitted over digital interfaces linking local transmitters and local receivers where the transmitters may include set-top boxes, digital video disk (DVD) players, personal computers, game consoles, and other devices, and the receivers may include repeaters or display devices, such as high definition televisions (TVs). For example, the HDCP protocol is often implemented to protect audiovisual content transmitted through a high-definition multimedia interface (HDMI) or a digital video interface (DVI) that links a local transmitter and receiver.

Various circuits may be configured to implement the HDCP protocol. These circuits may be implemented in application specific integrated circuits (ASICs) or configured into configurable integrated circuit (IC) dies, such as field programmable gate arrays (FPGAs). These circuits, while reliable, may receive unreliable content where bits in the content can be flipped or lost, causing verification loss between a transmitter and receiver. Verification loss typically results in a snow picture being displayed on a display, such as a television. Transmitters can be relatively slow in detecting verification loss of a communication link and receivers are not typically configured to detect verification loss of a link and resetting verification of the link.

Thus, an impetus exists to provide a circuit for a receiver that may detect a verification loss of a communication link and may request a transmitter to reset verification of the communication link.

DETAILED DESCRIPTION

Configurable integrated circuit (IC) dies that are often packaged discretely and as system-in-package (SiP) devices continue to fuel development in IC markets. Circuit emulation markets, application specific integrated circuit (ASIC) prototyping markets, and data center markets are a few of the developing IC markets fueled by configurable IC dies. Configurable IC dies directed toward circuit emulation markets often include several configurable IC dies packaged as a SiP to facilitate an almost unlimited number of emulated circuits where a single configurable IC die may be unable to supply sufficient programmable fabric for implementing an emulation circuit. Configurable IC dies directed toward ASIC prototyping markets often include a number of configurable ICs dies packaged as a SiP to implement a variety of ASICs, such as ASICs that implement one or more high-bandwidth digital content protection (HDPC) protocols (generally HDCP) for audiovisual content protection. Configurable IC dies directed toward data center markets are often discretely packaged or packaged as SiPs to facilitate ASIC functions in the data center, acceleration in the data center, to add processing capability, to add network and virtual network capability, to add non-volatile memory express capability, or other capabilities.

Configurable IC dies directed toward these markets and other markets may include field programmable gate arrays (FPGAs), programmable logic devices (PLDs), complex programmable logic devices (CPLDs), programmable logic arrays (PLAs), configurable logic arrays (CLAs), memory, transfer dies, and other ICs. Configurable IC dies typically include a number of configurable logic blocks that may be configured to implement various circuits. The logic blocks are interconnected by configurable interconnect structures that may be configured to interconnect the logic blocks in almost any desired configuration to provide almost any desired circuit.

Figure 1:
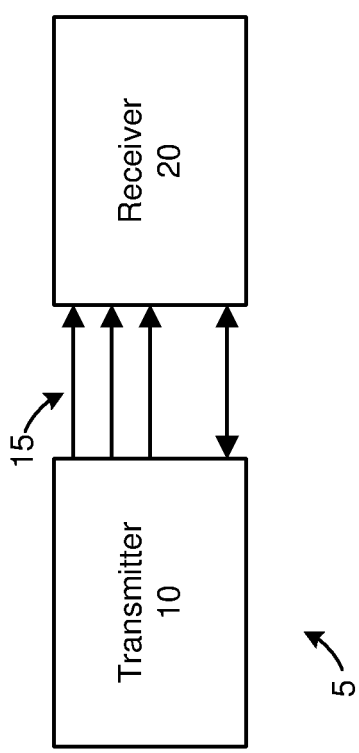
FIG. 1 illustrates a transmission system that includes a transmitter, a communication link, and a receiver where the communication link links the transmitter and the receiver.

FIG. 1 illustrates a transmission system 5 that includes a transmitter 10, a communication link 15, and a receiver 20, where the communication link links the transmitter and the receiver. The transmitter may transmit audiovisual content across the communication link to the receiver, which may play the audiovisual content. The transmitter and receiver may operate according to the HDCP protocol, such as the HDCP 1.4 protocol, and the communication link may be a link, which is permitted by the protocol.

The transmitter may be a local transmitter, such as a set-top box, a digital video disk (DVD) player, a personal computer, a game console, or another device. The receiver may be a local repeater, a local splitter repeater, or a local display device, such as high definition televisions (TVs). If the receiver is a repeater or a local splitter repeater, these devices may transmit to a receiver that is a TV or other display device. The communication link may be an HDMI link, digital video interface (DVI) link, or another link. The transmitter and receiver may be referred to as local devices because the communication link linking the transmitter and receiver may be about 20 meters or less, such as about 15 meters or less.

Figure 2:
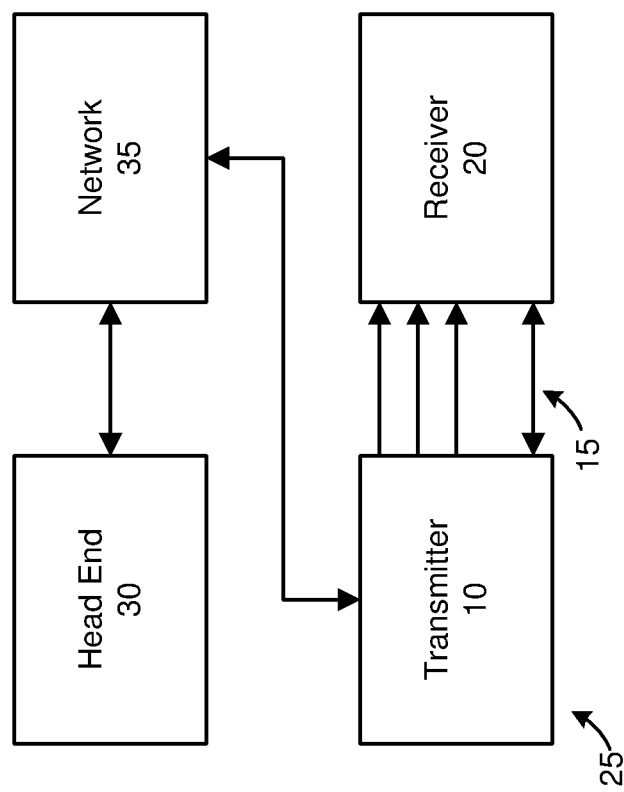
FIG. 2 illustrates a transmission system that includes a head end, a network, a transmitter, a communication link, and a receiver.

FIG. 2 illustrates a transmission system 25 that includes a head end 30, a network 35, transmitter 10, communication link 25, and receiver 20. The head end may be a transmission system of a company or other organization that transmits audiovisual content to consumer devices (e.g., one or more transmitters 10) across network 35. The consumer devices may be distributed across a geographical. Network 35 may include various intranets, the Internet, or both. The transmitter and receiver may operate according to the HDCP protocol and according to various described embodiments.

Figure 3:
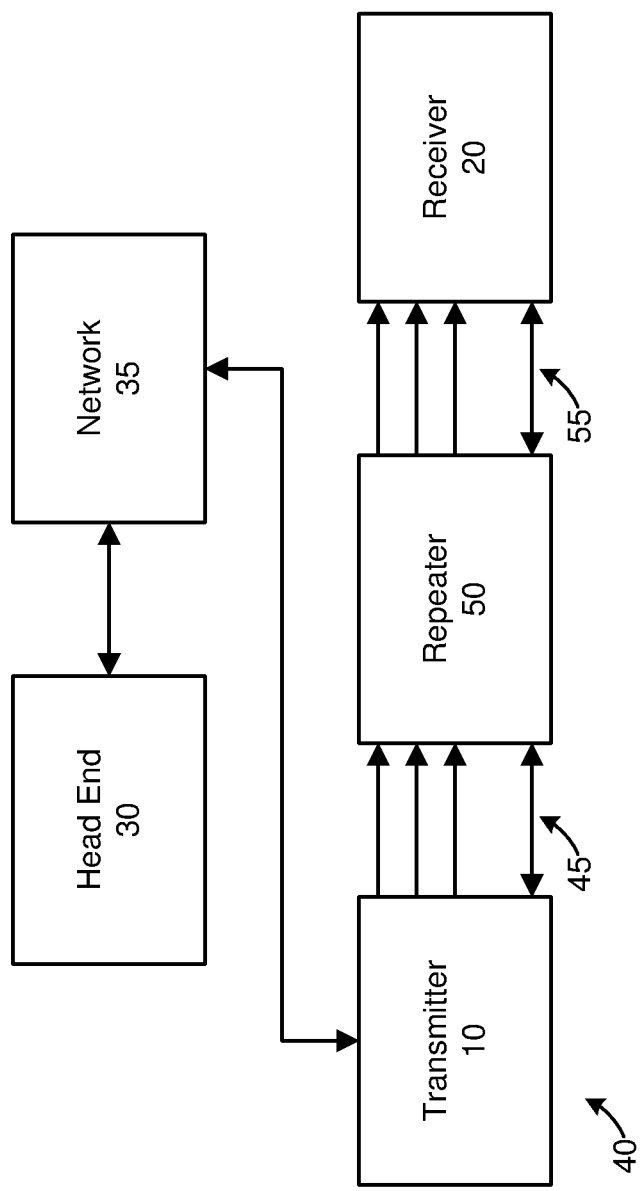
FIG. 3 illustrates a transmission system that includes a head end, a network, a transmitter, a communication link, a repeater, a communication link, and a receiver.

FIG. 3 illustrates a transmission system 40 that includes head end 30, network 35, transmitter 10, communication link 45, a repeater 50, a communication link 55, and receiver 20. The head end may transmit audiovisual content across the network to the transmitter. The transmitter may transmit the audiovisual content across communication link 45 to the repeater. The repeater may then transmit the audiovisual content across network 55 to the receiver. The repeater can extend the transmission distance between the transmitter and receiver. For example, the length of communication link 45 and 55 may each be less than about 20 meters, such as 15 meters or less. Communication links 45 and 55 may be both operate according to the HDCP protocol (such as HDCP 1.4) and according to various described embodiments.

Figure 4:
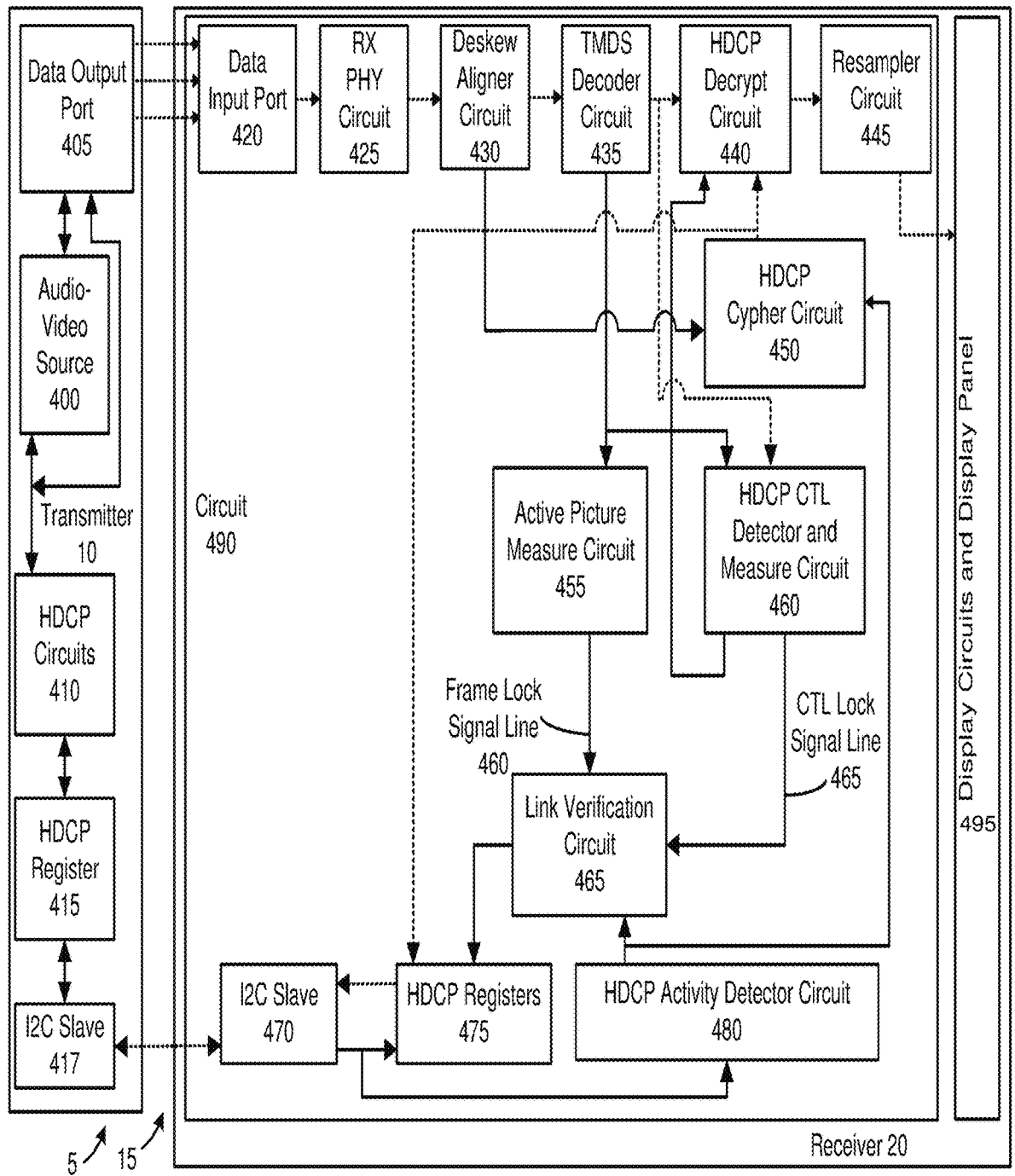
FIG. 4 illustrates another view of a transmission system, in an embodiment.

FIG. 4 illustrates another view of transmission system 5, in an embodiment. The transmitter 10 includes an audiovisual source 400, an audiovisual transmitter 405, a set of HDCP circuits 410, an HDCP register 415, a communication slave circuit 417 (e.g., an I2C slave) other circuits, or any combination of these circuits. The audiovisual source may be a digital video disk (DVD) source, a semiconductor memory (e.g., a solid-state drive), a transceiver that receives an audiovisual signal from a remote source such as a network, or another source. The audiovisual source may be connected to the audiovisual transmitter 405 by a data link over which audiovisual data may be transmitted. One or both of the audiovisual source and the audiovisual transmitter may be communicatively connected to one or more of the HDCP circuits in the set of HDPC circuits. The set of HDCP circuits may include one or more of an HDCP decryption circuit, an HDCP encryption circuit, a TMDS (transition-minimized differential signaling) encoder circuit, a link verification circuit, other circuits, or any combination of these circuits. The one or more circuits of the HDCP circuits may be connected to the HDCP registers. One or more of the HDCP circuits may retrieve data from the HDCP registers, transmit data into the HDCP registers for storage, or both. Data in the HDCP registers may be received from the I2C slave, which is connected to the HDCP registers, or received from the HDCP circuit.

Receiver 20 includes a data input port 420, a receiver circuit 425, a deskew aligner circuit 430, a TMDS decoder circuit 435, an HDCP decrypter circuit 440, a resampling circuit 445, an HDCP cypher circuit 450, an active-picture measure circuit 455, an HDCP CTL (control) detector and measure circuit 460, a link verification circuit 465, an I2C slave circuit 470, an HDCP register 475, and an HDCP activity detector circuit 480, one or more other circuits, or any combination of these circuits. Links between the circuits into the receiver, links into the receiver, and links out from the receiver are shown as solid and dashed lines. The solid lines in the receiver represent communication links across which control signals or status signals may be transmitted (i.e., asserted). The dashed lines in the receiver, entering the receiver, or exiting the receiver represent data links across which data (e.g., audiovisual frames) may be transmitted.

In an embodiment, one or more of the above-listed circuits may be configured in circuit 490. In an embodiment where circuit 490 is an FPGA, one or more of the above-listed circuits may be configured in the core fabric of an FPGA. In another embodiment, the above-listed circuits may be configured in an ASIC or another circuit.

In one embodiment, receiver 20 includes a display and display circuits 495. The display and display circuits may be connected by a data link to circuit 490. The display and display circuits receive video information from circuit 490 for display on the display via the data link. In an embodiment where the receiver is a repeater, for example, the receiver may not include the display and display circuits. In another embodiment, the receiver includes one or more speakers for generating and outputting an audio signal for video. In embodiments, where the receivers described in this patent are repeaters, the repeaters do not include the display, display circuits, and speakers.

The data output port and the data input port may be connected by a portion of communication link 15 and the I2C slaves of the transmitter and receiver may be connected by another portion of communication link 15. The data output and data input ports and the I2C slaves may be includes in HDMI ports, DVI data ports, or other ports the are included in the HDCP protocol. The communication link may include an HDMI cable, a DVI cable, or another communication cable.

The data input port is connected via a data link to the receiver circuit, which is connected via a data link to the deskew aligner circuit. The data input port may receive audiovisual data from the data output port and transmit the audiovisual data to the receiver circuit. The receiver circuit may transmit the received audiovisual data to the deskew aligner circuit. The deskew aligner port may temporally align portions of the received audiovisual signal, such as temporally aligning the signals for the various color signals included in the audiovisual signal received from the transmitter circuit.

The TMDS decoder circuit may be connected via a data link to the deskew aligner circuit and may receive the deskewed audiovisual data from the deskew aligner circuit. The TMDS decoder circuit may also be connected via a data link, a communication link, or both to the HDCP CTL detector and measure circuit, the active picture measure circuit, and the HDCP decrypter circuit. Specifically, the TMDs decoder circuit is connected between the deskew aligner circuit and the HDCP CTL detector and measure circuit, between the deskew aligner circuit and the active picture measure circuit, and between the deskew aligner circuit and the HDCP decrypter circuit.

The TMDS decoder may decode the TMDS encoded audiovisual signal according to a TMDS algorithm. Subsequent to decoding the audiovisual signal, the TMDS decoder may transmit the audiovisual signal to one or more of the HDCP CTL detector and measure circuit, the active picture measure circuit, and the HDCP decrypter circuit. The TMDS decoder may also transmit information from in the audiovisual signal to one or both of the HDCP CTL detector and measure circuit and to the HDCP decrypter circuit.

Both of the HDCP CTL detector and measure circuit and the active picture measure circuit are connected via communication links to the link verification circuit. The HDCP CTL detector and measure circuit and the active picture measure circuit may transmit one or more control signals to the link verification circuit that indicates whether communication between the transmitter and the receiver is authentic. For example, the HDCP CTL detector and measure circuit may transmit a CTL (control) lock signal to the link verification circuit to indicate whether the CTL signal in a series of two or more video frames is locked or unlocked. The CTL lock signal may be transmitted across a CTL lock signal line 465 that connects the link verification circuit and the HDCP CTL detector and measure circuit. The active picture measure circuit may transmit a frame lock signal to the link verification circuit to indicate whether the active video geometry of two or more video frames is locked or unlocked. The frame lock signal may be transmitted across a frame lock signal line 460 that connects the link verification circuit and the active picture measure circuit. The HDCP CTL detector and measure circuit and the active picture measure circuit are described further below.

The link verification circuit is connected via a communication link to the HDCP registers and can write to the registers based on the states of the CTL lock signal, the frame lock signal, or both. The HDCP registers are connected via a data link and a communication link to the I2C slave of the receiver and the I2C slave of the receiver is connected to the I2C slave of the transmitter by communication link 15. The HDCP circuits of the transmitter may access the HDCP registers of the receiver to retrieve data stored in the registers, such as data stored in the registers by the link verification circuit.

The link verification circuit is also connected via a communication link to the HDCP activity detector circuit. The HDCP activity detector circuit is also connected via a communication link to the HDCP registers and can monitor whether data is written to the registers, read from the registers, or both.

Both of the link verification circuit and the HDCP cypher circuit are connected via communication links to the HDCP activity detector circuit and can receive output from this circuit. The HDCP cypher circuit is connected via a data link to the HDCP decrypter circuit. The HDCP decrypter circuit can decrypt frames of the audiovisual signal received from the TMDS decoder circuit and transmit the decrypted frames to the resampler circuit. The HDCP decrypter circuit may receive a private keys Mi' and use the key for decryption (described further below). The HDCP decrypter circuit is connected via a communication link to the HDCP CTL detector and measure circuit. The HDCP CTL detector and measure circuit may transmit an enable control signal to the HDCP cecrypter circuit to enable or disable decryption by the HDCP decrypt circuit, for example, if the CTL signal is locked (e.g., enable signal asserted) or unlocked (e.g., disable signal asserted, i.e., enable signal de-asserted).

The display and display circuits may be connected by one or more data links, communication links, or both to the resampler circuit and received the decrypted frames from the resampler circuit for display on the display. In an embodiment where the receiver 20 is a repeater or includes a repeater, the decrypted frames may be transmitted from the receiver to another device.

In an embodiment, the receiver detects whether an audiovisual signal transmitted from the transmitter to the receiver is unstable and the receiver notifies the transmitter that communication is unstable if the receiver has detected the instability. Lack of stability in the audiovisual signal typically results in a snowy picture being displayed on the display. Communication between the transmitter and receiver may be unstable if synchronization is not achieved or if synchronization is lost. Synchronization is lost when the transmitter transmits a first frame and the receiver operates on a second frame that is different from the first frame, but performs various operations on the second frame using parameters for the first frame. Detection of the synchronization state of the transmitter and receiver is sometimes referred to as link verification.

Figure 5:
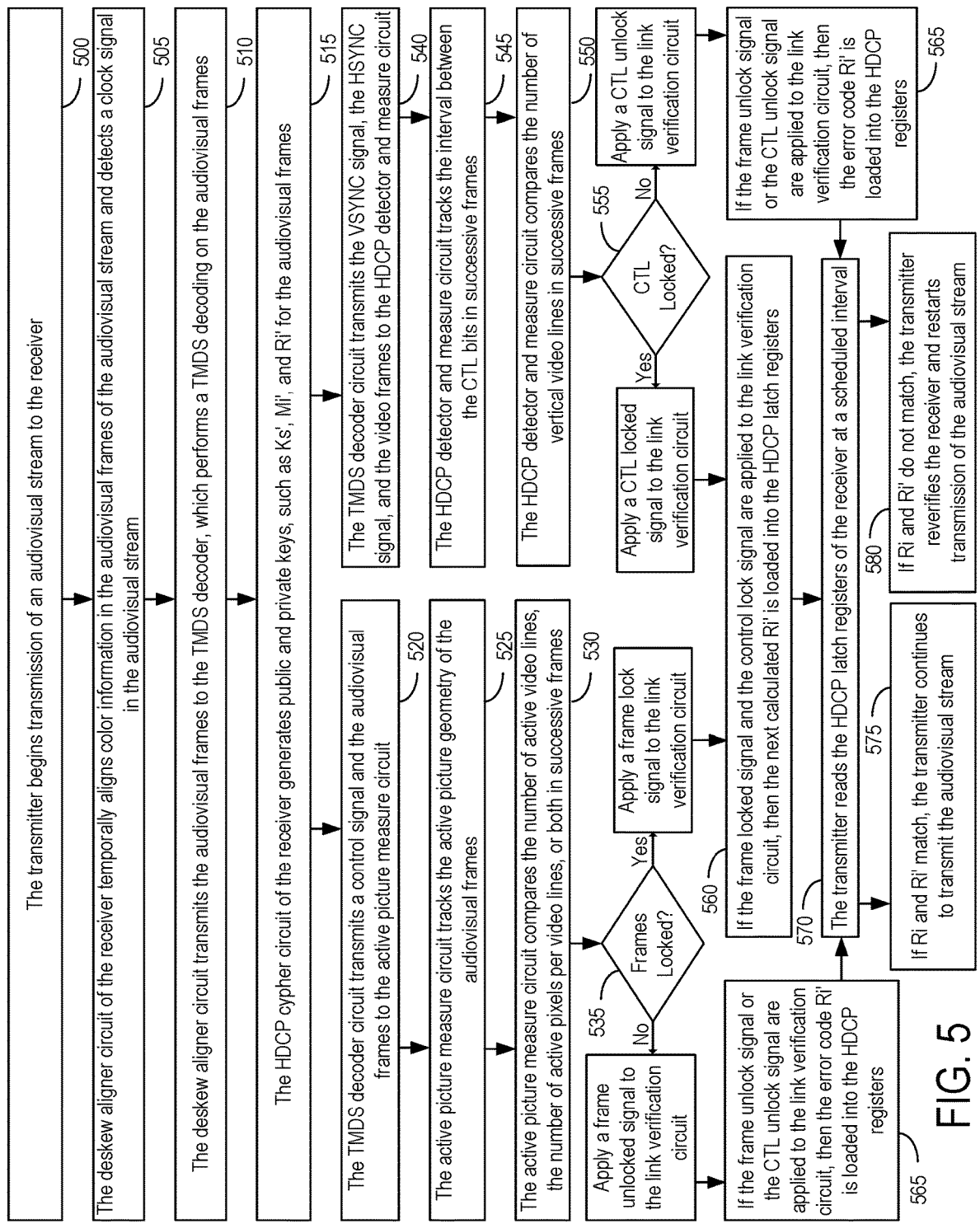
FIG. 5 is a flow diagram of a method for a receiver determining whether an audiovisual stream transmitted from the transmitter to the receiver is stable or unstable, and the receiver signaling to the transmitter that the stream is stable or unstable so that the transmitter may reset the audiovisual transmission.

FIG. 5 is a flow diagram of a method for a receiver determining whether an audiovisual stream transmitted from the transmitter to the receiver is stable or unstable, and the receiver signaling to the transmitter that the stream is unstable so that the transmitter may reset the audiovisual signal transmission from the transmitter to the receiver. The flow diagram represents one example embodiment. Steps may be added to, removed from, or combined in the flow diagram without deviating from the scope of the embodiment.

Figure 6:
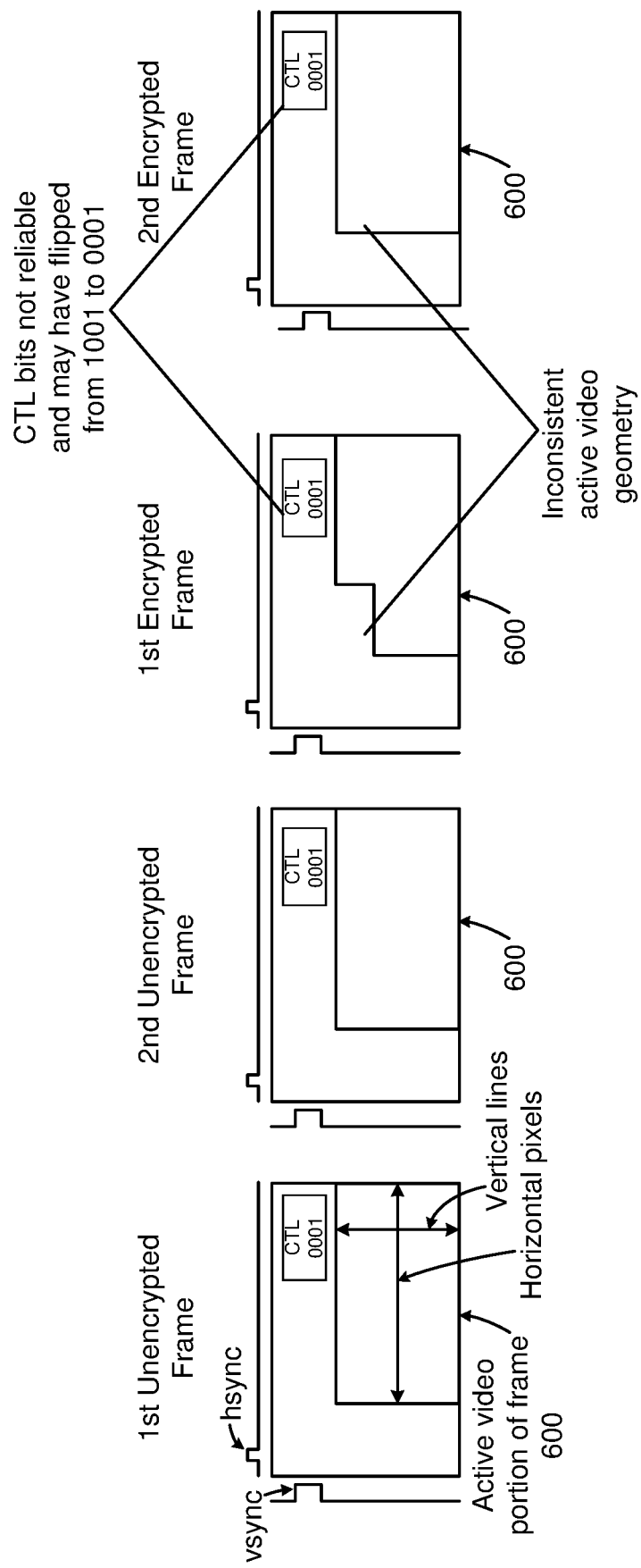
FIG. 6 is a diagram of audiovisual frames that may be transmitted from the transmitter to the receiver.

FIG. 6 is a diagram of audiovisual frames that may be transmitted from the transmitter to the receiver and will be described in combination with the flow diagram shown in FIG. 5. FIG. 6 shows four frames that may be transmitted from the transmitter to the receiver. The first two frames may be unencrypted frames that may be the first frames that the transmitter transmits to the receiver. The subsequent frames may be encrypted frames. The unencrypted frames may include video frames, such as color test frames, blue frames, or other test images that may not be encrypted. The encrypted frames may be the audiovisual frames for the audiovisual stream that are part of an audiovisual program, such as a movie, a TV program, or other content.

At 500, the transmitter begins transmission of an audiovisual stream to the receiver including, for example, the four audiovisual frames shown in FIG. 6. The audiovisual stream is transmitted in a frame by frame manner from the transmitter to the receiver. The audiovisual frames may include the initial frames that are unencrypted and subsequent frames that are encrypted.

The frames of the audiovisual signal may be generated by the audiovisual source, and transmitted from the data output port of the transmitter and across the communication link to the data input port of the receiver. The frames of the audiovisual signal may be transmitted from the data input port to the receiver circuit and transmitted from the receiver circuit to the deskew aligner circuit.

At 505, the deskew aligner circuit temporally aligns information (e.g., bits for different color information) in the frames and detects a stable link clock in the audiovisual stream. If the link clock is stable, the method proceeds.

At 510, the deskew aligner circuit transmits received audiovisual frames to the TMDS decoder, which performs a TMDS decoding on the frames. The deskew aligner circuit may also transmit a control signal (e.g., a link lock signal) to the HDCP cypher circuit that indicates a stable link clock is detected.

At 515, the HDCP cypher circuit generates public and private keys, such as Ks', Mi', and Ri' for the various frames. Mi' is generated for each frame, and Ri' is generated for every $128^{th}$ frame, unless a validation error occurs as is explained below in which case Ri' is set to an error code, such as 0000.

At 520, the TMDS decoder circuit transmits a control signal to the active picture measure circuit and may transmit the audiovisual frames to the active picture measure circuit. The control signal is referred to as the vid_de signal and when asserted, activates the active picture measure circuit to count the number of active pixels per each video line in each frame of video.

At 525, the active picture measure circuit tracks the active picture geometry of the received frames. The active picture geometry of a frame includes the video information included in the frame, such as the lines if pixel information for the lines and pixels of the display screen. Specifically, the active picture measure circuit counts the number of active video lines per frame of the active video portion of a frame and counts the number of active pixels per active video line per frame of the active video portion of a frame. FIG. 6 shows a series of audiovisual frames and identifies the active video portions 600 of the frames.

At 530, the active picture measure circuit compares the number of active video lines, the number of active pixels per video lines, or both in successive frames. If the number of video lines in successive frames is consistent and if the number of pixels per video lines is consistent in successive frames, then the active frame geometry and the frames are consistent and are referred to as "locked." Thus, the first encrypted video frame has consistent active video geometry with respect to the other frames. If the active video geometry of the frames is consistent, then the CTL bits of the frames are reliable.

The CTL bits of the frames indicate whether the frames are unencrypted or encrypted. For example, CTL bits of 0001 indicate that a frame is unencrypted and CTL bits of 1001 indicate that the frame is encrypted. The CTL bits are at a known location in each frame.

If the number of video lines in successive frames is inconsistent and if the number of pixels per video lines is inconsistent in successive frames, then the active frame geometry is inconsistent and is referred to as "unlocked." For example, the first encrypted video frame shown in FIG. 6 is missing pixel information for a number of video lines in the active video portion of the frame. Thus, the first encrypted video frame has inconsistent active video geometry with respect to the other frames, and the active video geometry of the frames becomes inconsistent at approximately when the 1st and 2nd encrypted frames are received by the receiver. If the active video geometry of the frames is inconsistent, then the CTL bits of the frames are not reliable and the receiver will not know if the frame is an encrypted frame or a decrypted frame If the active video geometry becomes inconsistent as shown in FIG. 6, then this inconsistency is an indication that the active link between the transmitter and receiver became unstable at about around the time when the 1st and 2nd encrypted frames are received by the receiver.

The CTL value in 1st and 2nd encrypted frames cannot be trusted because the CTL value may have flipped from encrypted (1001) to unencrypted (0001). The receiver may, therefore, incorrectly determine that a frame that is encrypted as unencrypted. The receiver may not generate a key Mi' for decrypting this frame, and may generate a key Mi' for decrypting the next frame. The key Mi' for the next frame will actually be the key for the preceding frame. Therefore, the keys will be off by one or more frames for every frame that is decrypted until the link between the transmitter and receiver is reset. Because each key Mi' is frame specific, a key that is used to decrypt a frame that the key is not associated with not be able to be used by the receiver to decrypt the frame successfully. And, a snowy picture will result.

Figure 7:
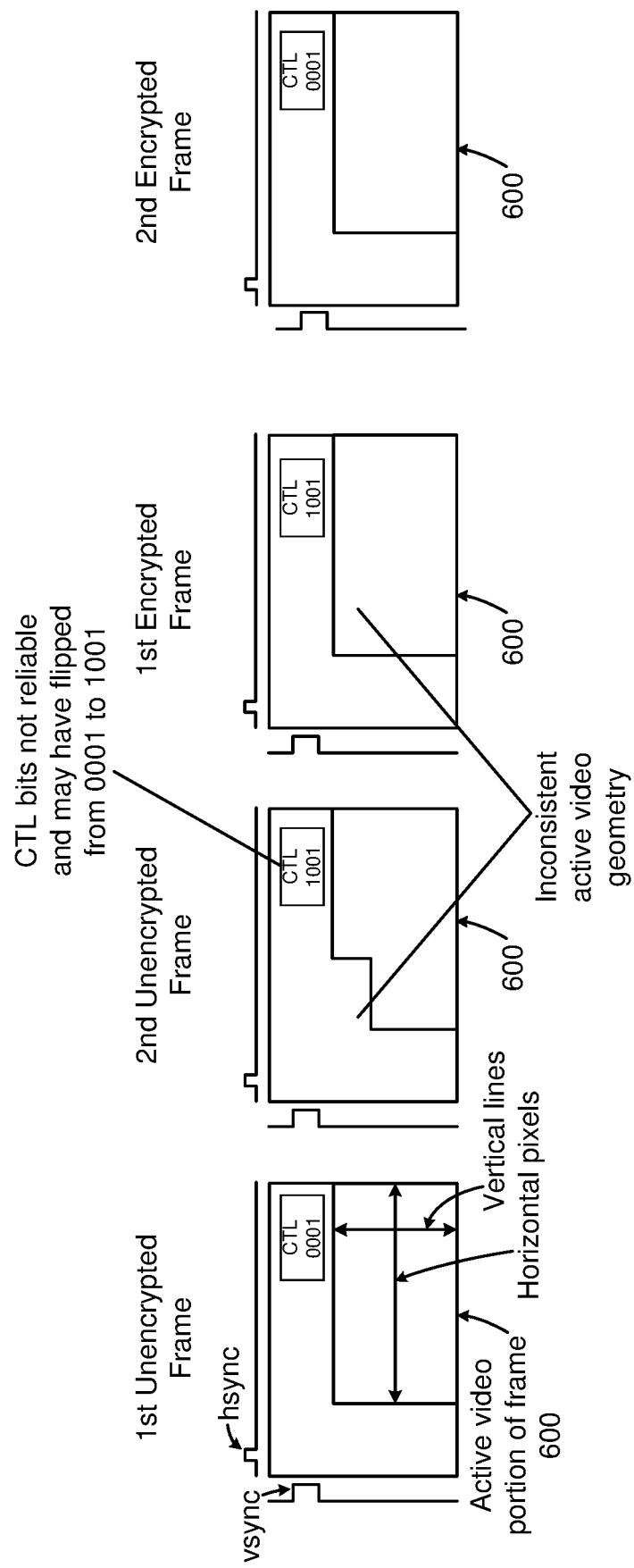
FIG. 7 shows a series of audiovisual frames where the 2nd unencrypted video frame has inconsistent active video geometry with respect to the other frames.

FIG. 7 shows a series of audiovisual frames where the 2nd unencrypted video frame has inconsistent active video geometry with respect to the other frames. The active video geometry of the frames becomes inconsistent at approximately a time when the 2nd unencrypted and the 1st encrypted frames are received by the receiver. The CTL value in the 2nd unencrypted frame cannot be trusted because the CTL value for this frame may have flipped from unencrypted (0001) to encrypted (1001).

The receiver may, therefore, incorrectly determine that a frame that is unencrypted as encrypted. The receiver may generate a key Mi' for decrypting this unencrypted frame, and may generate a keys Mi' decrypting the next frame and subsequent frames. The key Mi' for the unencrypted frame will actually be the key for the following encrypted frame. Therefore, the keys will be off by one frame for every frame that is decrypted until the link between the transmitter and receiver is reset. Again, because each key Mi' is frame specific, a key that is used to decrypt a frame that the key is not associated with not be able to be used by the receiver to decrypt the frame successfully. And, a snowy picture will result.

At 535, if the active picture measure circuit determines that the frames are locked, the active picture measure circuit applies a frame locked (FRAME_LOCK) signal to the link verification circuit. If the active picture measure circuit determines that the frames are not locked, the active picture measure circuit applies a frame unlock signal (e.g., de-asserts the frame lock signal) to the link verification circuit.

At 540, the TMDS decoder circuit transmits the vertical synchronization (VSYNC) signal, the horizontal synchronization (HSYNC) signals (e.g., one HSYNC signal per vertical line of a frame), and the video frames to the HDCP detector and measure circuit.

At 545, the HDCP detector and measure circuit tracks the interval between the CTL bits in successive frames. To determine the interval between the CTL bits in successive frames, the HDCP detector and measure circuit uses the VSYNC signal to locate the CTL bits in successive TMDS decoded frames. Additionally, the HDCP detector and measure circuit counts the number of vertical lines between the CTL bits in the successive frames. The HDCP detector and measure circuit uses the HSYNC signals (one HSYNC signal per vertical line of a frame) as references for counting the number of vertical lines in successive frames. In an embodiment, the vertical lines in the active video portions of successive frames are counted.

At 550, the HDCP detector and measure circuit compares the number of vertical video lines in successive frames. If the HDCP detector and measure circuit determines that the number of vertical lines between successive CTL bit in two or more successive frames is consistent, then the interval between the CTL bits is valid and locked. Sometimes the condition is referred to as the CTL bits being locked. The CTL bits are locked if VERTICAL_LINES1 of frame 1 are equal to VERTICAL_LINES2 of frame 2, where frames 1 and 2 are successive frames. Further, if the number of vertical lines is consistent in two or more frames, then the communication link between the transmitter and the receiver is valid and locked.

If the HDCP detector and measure circuit determines that the number of vertical lines between successive CTL bits in two or more successive frames is inconsistent, then the interval between the CTL bits is invalid and unlocked. Sometimes the condition is referred to as the CTL bits being unlocked. The CTL bits are unlocked if VERTICAL_LINES1 of frame 1 are unequal to VERTICAL_LINES2 of frame 2, where frames 1 and 2 are successive frames. Further, if the number of vertical lines is inconsistent in two or more frames, then the communication link between the transmitter and the receiver is invalid and unlocked.

Figure 8:
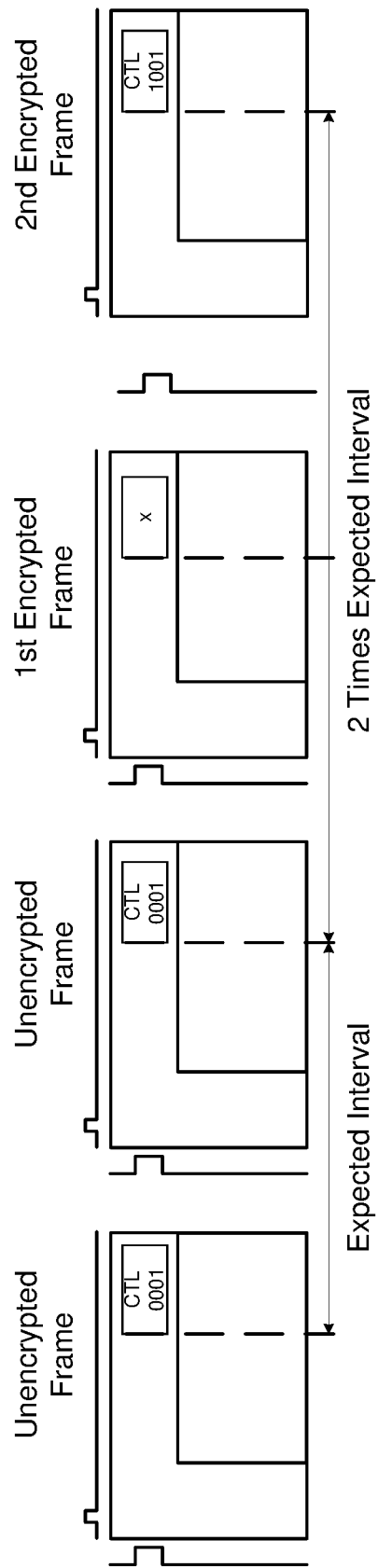
FIG. 8 shows four audiovisual frames that may be transmitted from the transmitter to the receiver and shows an expected interval between CTL bits and an unexpected interval between CTL bits.

FIG. 8 shows four audiovisual frames that may be transmitted from the transmitter to the receiver. The first two frames may be unencrypted frames that may be the first frames that the transmitter transmits to the receiver. The subsequent frames may be encrypted frames. The unencrypted frames may include video, such as color test frames, blue frames, or other test images that may not be encrypted. The encrypted frames may be the video frames for the audiovisual stream that are part of an audiovisual program, such as a movie, a TV program, or other content.

FIG. 8 shows an example of an expected interval between CTL bits and an example of an unexpected interval between CTL bits. In the example, the expected interval is between the CTL bits of successively transmitted frames of the unencrypted frames. The unexpected interval is between the CTL bits between the 2nd unencrypted frame and the 2nd encrypted frame.

The interval is unexpected because the CTL bits of the 1st encrypted frame is not received by the receiver. Specifically, if the transmitter begins sending encrypted frames while the receiver is unsuccessfully attempting to acquire a lock on the received frames, the CTL signal of 1st encrypted frame or more frames may be missed. The interval between the CTL signal in the last unencrypted frame and the next detected CTL signal (2nd encrypted frame) is two times of the expected interval. In the example being considered, the receiver assumes the 2nd encrypted frame is the 1st encrypted frame. The same assumption applies to the subsequently received frames.

In the example of FIG. 8, the receiver may generate a key Mi' for the 1st encrypted frame and use this key for decrypting the 2nd encrypted frame. The mismatch between keys and frames may continue until the transmitter resets the communication link between the transmitter and receiver. More generally, the mismatch of keys will be off by one or more frames for every frame that is missed by the receiver. Because each key Mi' is frame specific, a key that is used to decrypt a frame that the key is not associated with not be able to be used by the receiver to decrypt the frame successfully. And, a snowy picture will result.

At 555, if the HDCP detector and measure circuit determines that the frames are locked, the HDCP detector and measure circuit applies a control lock signal (CTL_LOCK) to the link verification circuit. If the HDCP detector and measure circuit determines that the frames are unlocked, the HDCP detector and measure circuit applies a control unlock signal (e.g., de-assert the CTL_LOCK) to the link verification circuit.

At 560, if the active picture measure circuit applies the frame locked signal to the link verification circuit and if the HDCP detector and measure circuit applies the control lock signal to the link verification circuit, then the next calculated Ri' is loaded into the HDCP latch registers 475. In alternative embodiments, other Ri' may be loaded into the HDCP latch registers. For example, every 128th generated Ri' is loaded into the HDCP latch registers.

At 565, if the active picture measure circuit applies the frame unlock signal to the link verification circuit or if the HDCP detector and measure circuit applies the control unlock signal to the link verification circuit, then the error code for Ri' (e.g., 0000) is loaded into the HDCP latch registers 475.

At 570, the transmitter reads the HDCP latch registers of the receiver at a scheduled interval.

At 575, if the Ri of the transmitter and the Ri' of the receiver match, the transmitter continues to transmit the audiovisual stream to the receiver, the HDCP cipher circuit continues to generate Mi' keys for transmission to and use by the HDCP decrypter circuit, the HDCP CTL detector and measure circuit enable the HDCP decrypter circuit for decryption, and decrypted audiovisual frames are transmitted from the HDCP decrypter circuit for use, for example, by the display.

At 580, if the Ri and Ri' do not match (e.g., Ri' is set to the error code, such as 0000), the transmitter restarts verification of the receiver and restarts transmission of the audiovisual stream if the receiver remains a valid receiver. And, the HDCP CTL detector and measure circuit may disable the HDCP decrypter circuit.

When the transmitter reads the HDCP latch register of the receiver, the HDCP activity detector detects that the register is being read by the transmitter. The HDCP activity detector may then signal to the HDCP cipher circuit that the communication link between the transmitter and receiver is authenticated or not authenticated. If the communication link is authenticated, then the HDCP cipher circuit will generate private and public keys, where Mi' may be used by the HDCP decrypt circuit for decrypting the frames.

Figure 9:
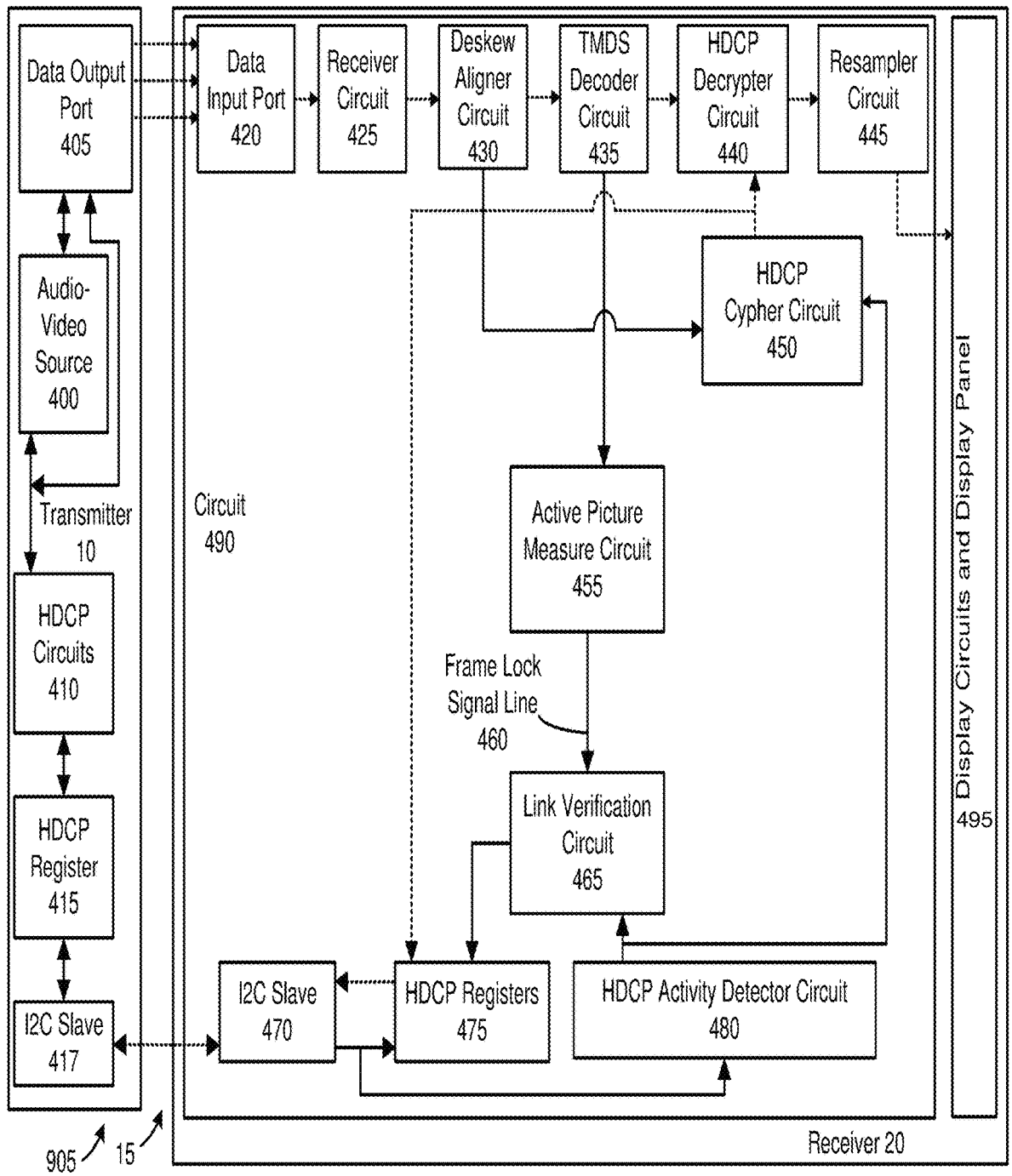
FIG. 9 illustrates a view of a transmission system, in an embodiment.

FIG. 9 illustrates a view of a transmission system 905, in an embodiment. Transmission system 905 is similar to transmission system 5, but differs in that the receiver of transmission system 905 does not include the HDCP CTL detector and measure circuit transmission system 5.

Figure 10:
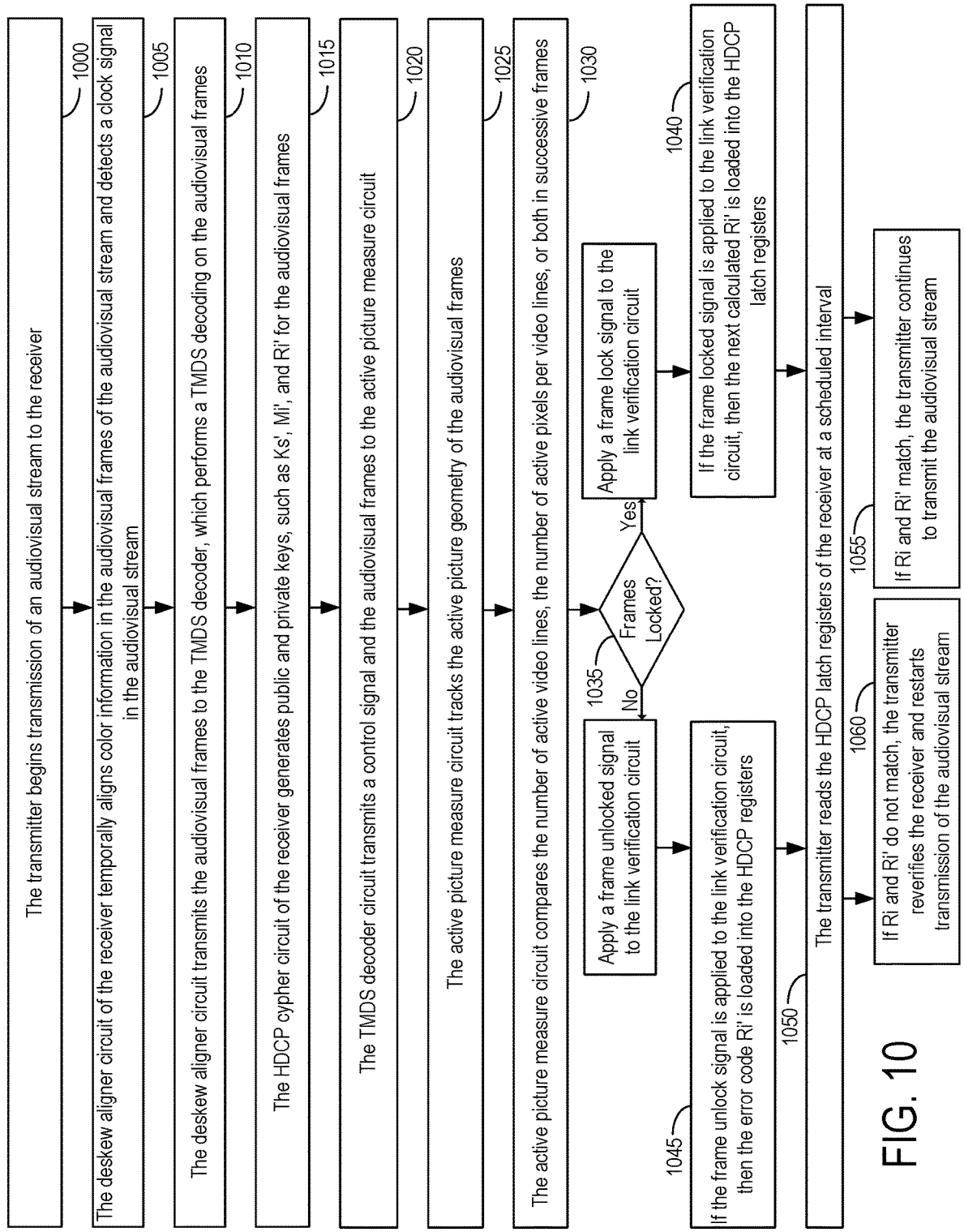
FIG. 10 is a flow diagram of a method of operation of the transmission system shown in FIG. 9.

FIG. 10 is a flow diagram of a method of operation of transmission system 905 for a receiver determining whether an audiovisual stream transmitted from the transmitter to the receiver is stable or unstable, and the receiver signaling to the transmitter that the stream is unstable so that the transmitter may reset the audiovisual signal transmission from the transmitter to the receiver. The flow diagram represents one example embodiment. Steps may be added to, removed from, or combined in the flow diagram without deviating from the scope of the embodiment.

At 1000, the transmitter begins transmission of an audiovisual stream to the receiver including, for example, the four audiovisual frames shown in FIG. 6. The audiovisual stream is transmitted in a frame by frame manner from the transmitter to the receiver. The audiovisual frames may include the initial frames that are unencrypted and subsequent frames that are encrypted.

The frames of the audiovisual signal may be generated by the audiovisual source, and transmitted from the data output port of the transmitter and across the communication link to the data input port of the receiver. The frames of the audiovisual signal may be transmitted from the data input port to the receiver circuit and transmitted from the receiver circuit to the deskew aligner circuit.

At 1005, the deskew aligner circuit may temporally align information (e.g., bits for different color information) in the frames and may detect a stable link clock in the audiovisual stream. If the link clock is stable, the method proceeds.

At 1010, the deskew aligner circuit transmits received audiovisual frames to the TMDS decoder, which performs a TMDS decoding on the frames. The deskew aligner circuit may also transmit a control signal (e.g., a link lock signal) to the HDCP cypher circuit that indicates a stable link clock is detected.

At 1015, the HDCP cypher circuit generates public and private keys, such as Ks', Mi', and Ri' for the various frames. Mi' is generated for each frame, and Ri' is generated for every $128^{th}$ frame, unless a validation error occurs as is explained below in which case Ri' is set to an error code, such as 0000.

At 1020, the TMDS decoder circuit transmits a control signal to the active picture measure circuit and may transmit the video frames to the active picture measure circuit. The control signal is referred to as the vid_de signal and when asserted, activates the active picture measure circuit to count the number of active pixels per each video line in each frame of video.

At 1025, the active picture measure circuit tracks the active picture geometry of the received frames. The active picture geometry of a frame includes the video information included in the frame, such as the lines if pixel information for the lines and pixels of the display screen. Specifically, the active picture measure circuit counts the number of active video lines per frame of the active video portion of a frame and counts the number of active pixels per video line per frame of the active video portion of a frame. FIG. 6 shows a series of audiovisual frames and identifies the active video portions 600 of the frames.

At 1030, the active picture measure circuit compares the number of active video lines, the number of active pixels per video lines, or both in successive frames. If the number of video lines in successive frames is consistent and if the number of pixels per video lines is consistent in successive frames, then the active frame geometry is consistent and is locked. Thus, the first encrypted video frame has consistent active video geometry with respect to the other frames. If the active video geometry of the frames is consistent, then the CTL bits of the frames are reliable.

If the number of video lines in successive frames is inconsistent and if the number of pixels per video lines is inconsistent in successive frames, then the active frame geometry is inconsistent and is unlocked. If the active video geometry of the frames is inconsistent, then the CTL bits of the frames are not reliable and the transmitter will not know if the frame is an encrypted frame or a decrypted frame At 1035, if the active picture measure circuit determines that the frames are locked, the active picture measure circuit applies a frame locked (FRAME_LOCK) signal to the link verification circuit. If the active picture measure circuit determines that the frames are not locked, the active picture measure circuit applies a frame unlock signal (e.g., deasserts the frame lock signal) to the link verification circuit.

At 1040, if the active picture measure circuit applies the frame locked signal to the link verification circuit, then the next calculated Ri' is loaded into the HDCP latch registers 475. In alternative embodiments, other Ri' may be loaded into the HDCP latch registers. For example, every 128th generated Ri' is loaded into the HDCP latch registers.

At 1045, if the active picture measure circuit applies the frame unlock signal to the link verification circuit, then the error code for Ri' (e.g., 0000) is loaded into the HDCP latch registers 475.

At 1050, the transmitter reads the HDCP latch registers of the receiver at a scheduled interval, such as every 2 seconds.

At 1055, if the Ri of the transmitter and the Ri' of the receiver match, the transmitter continues to transmit the audiovisual stream to the receiver.

At 1060, if the Ri and Ri' do not match (e.g., Ri' is set to the error code, such as 0000), the transmitter restarts verification of the receiver and restarts transmission of the audiovisual stream if the receiver remains a valid receiver.

When the transmitter reads the HDCP latch register of the receiver, the HDCP activity detector detects that the register is being read by the transmitter. The HDCP activity detector may then signal to the HDCP cipher circuit that the communication link between the transmitter and receiver is authenticated or not authenticated. If the communication link is authenticated, then the HDCP cipher circuit will generate private and public keys, where Mi' may be used by the HDCP decrypt circuit for decrypting the frames.

Figure 11:
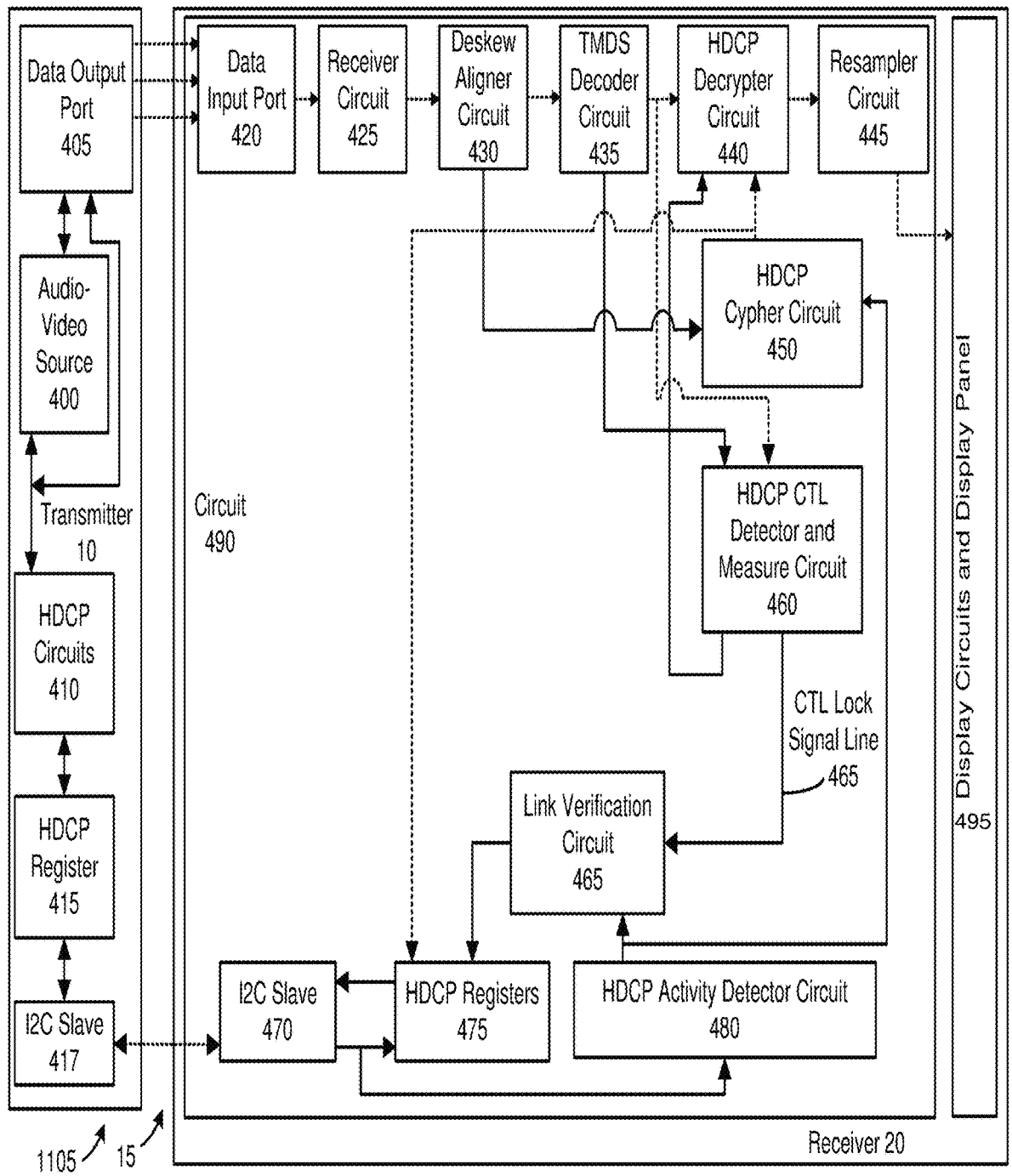
FIG. 11 illustrates a view of a transmission system, in an embodiment.

FIG. 11 illustrates a view of a transmission system 1105, in an embodiment. Transmission system 1105 is similar to transmission system 5, but differs in that the receiver of transmission system 1105 does not include the active picture measure circuit of transmission system 5.

Figure 12:
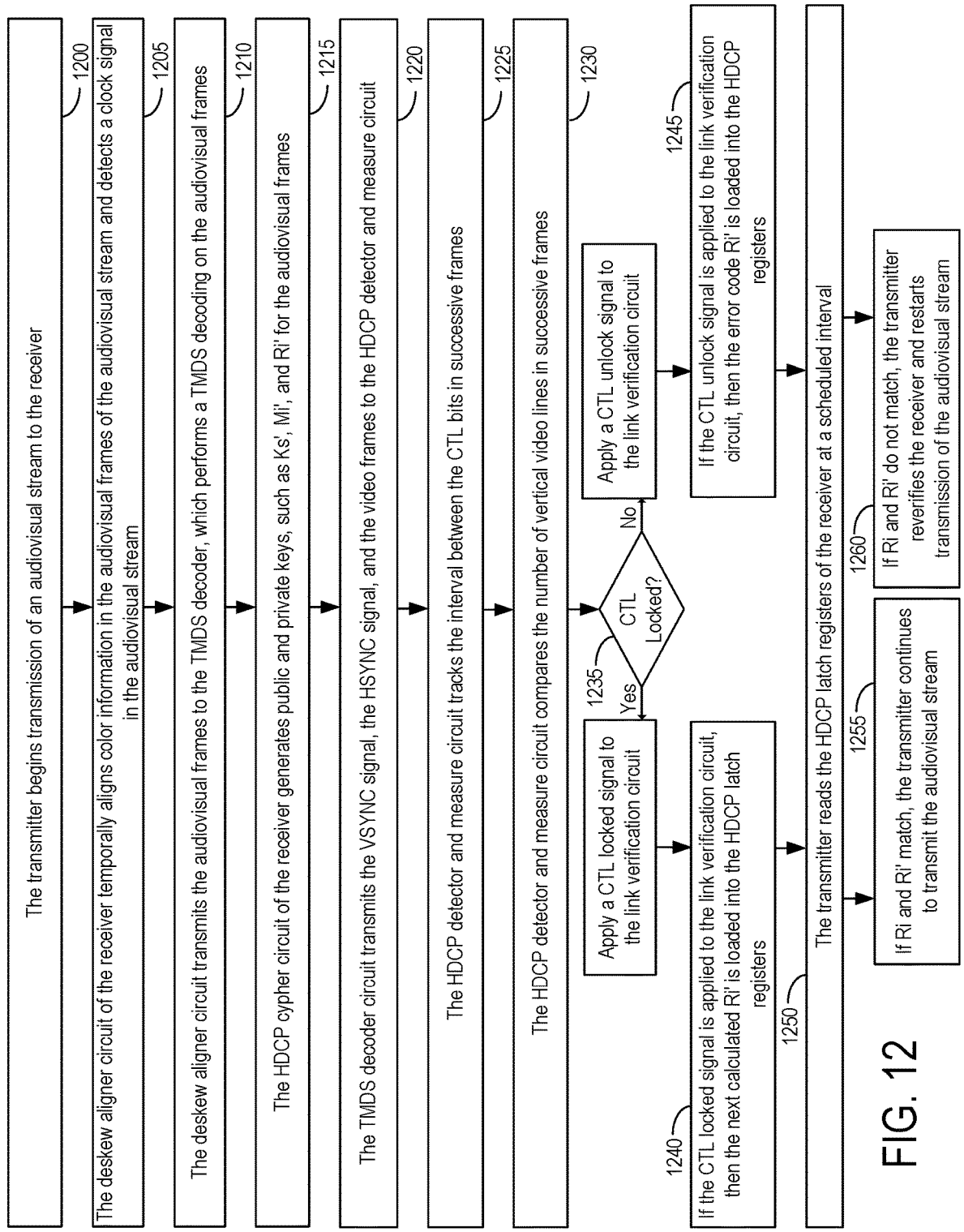
FIG. 12 is a flow diagram of a method of operation of the transmission system shown in FIG. 11.

FIG. 12 is a flow diagram of a method of operation of transmission system 1105 for a receiver determining whether an audiovisual stream transmitted from the transmitter to the receiver is stable or unstable, and the receiver signaling to the transmitter that the stream is unstable so that the transmitter may reset the audiovisual signal transmission from the transmitter to the receiver. The flow diagram represents one example embodiment. Steps may be added to, removed from, or combined in the flow diagram without deviating from the scope of the embodiment.

At 1200, the transmitter begins transmission of an audiovisual stream to the receiver including, for example, the four audiovisual frames shown in FIG. 6. The audiovisual stream is transmitted in a frame by frame manner from the transmitter to the receiver. The audiovisual frames may include the initial frames that are unencrypted and subsequent frames that are encrypted.

The frames of the audiovisual signal may be generated by the audiovisual source, and transmitted from the data output port of the transmitter and across the communication link to the data input port of the receiver. The frames of the audiovisual signal may be transmitted from the data input port to the receiver circuit and transmitted from the receiver circuit to the deskew aligner circuit.

At 1205, the deskew aligner circuit may temporally align information (e.g., bits for different color information) in the frames and may detect a stable link clock in the audiovisual stream. If the link clock is stable, the method proceeds.

At 1210, the deskew aligner circuit transmits received audiovisual frames to the TMDS decoder, which performs a TMDS decoding on the frames. The deskew aligner circuit may also transmit a control signal (e.g., a link lock signal) to the HDCP cypher circuit that indicates a stable link clock is detected.

At 1215, the HDCP cypher circuit generates public and private keys, such as Ks', Mi', and Ri' for the various frames. Mi' is generated for each frame, and Ri' is generated for every $128^{th}$ frame, unless a validation error occurs as is explained below in which case Ri' is set to an error code, such as 0000.

At 1220, the TMDS decoder circuit transmits the vertical synchronization (VSYNC) signal, the horizontal synchronization (HSYNC) signals (e.g., one HSYNC signal per vertical line of a frame), and the video frames to the HDCP detector and measure circuit.

At 1225, the HDCP detector and measure circuit tracks the interval between the CTL bits in successive frames. To determine the interval between the CTL bits in successive frames, the HDCP detector and measure circuit uses the VSYNC signal to locate the CTL bits in successive TMDS decoded frames. Additionally, the HDCP detector and measure circuit counts the number of vertical lines between the CTL bits in the successive frames. The HDCP detector and measure circuit uses the HSYNC signals (one HSYNC signal per vertical line of a frame) as references for counting the number of vertical lines in successive frames. In an embodiment, the vertical lines in the active video portions of successive frames are counted.

At 1230, the HDCP detector and measure circuit compares the number of vertical video lines in successive frames. If the HDCP detector and measure circuit determines that the number of vertical lines between successive CTL bit in two or more successive frames is consistent, then the interval between the CTL bits is valid and locked. Sometimes the condition is referred to as the CTL bits being locked. The CTL bits are locked if VERTICAL_LINES1 of frame 1 are equal to VERTICAL_LINES2 of frame 2, where frames 1 and 2 are successive frames. Further, if the number of vertical lines is consistent in two or more frames, then the communication link between the transmitter and the receiver is valid and locked.

If the HDCP detector and measure circuit determines that the number of vertical lines between successive CTL bits in two or more successive frames is inconsistent, then the interval between the CTL bits is invalid and unlocked. Sometimes the condition is referred to as the CTL bits being unlocked. The CTL bits are unlocked if VERTICAL_LINES1 of frame 1 are unequal to VERTICAL_LINES2 of frame 2, where frames 1 and 2 are successive frames. Further, if the number of vertical lines is inconsistent in two or more frames, then the communication link between the transmitter and the receiver is invalid and unlocked.

At 1235, if the HDCP detector and measure circuit determines that the frames are locked, the HDCP detector and measure circuit applies a control lock signal (CTL_LOCK) to the link verification circuit. If the HDCP detector and measure circuit determines that the frames are unlocked, the HDCP detector and measure circuit applies a control unlock signal (e.g., deassert the CTL_LOCK) to the link verification circuit.

At 1240, if the HDCP detector and measure circuit applies the control lock signal to the link verification circuit, then the next calculated Ri' is loaded into the HDCP latch registers 475. In alternative embodiments, other Ri' may be loaded into the HDCP latch registers. For example, every 128th generated Ri' is loaded into the HDCP latch registers.

At 1245, if the HDCP detector and measure circuit applies the control unlock signal to the link verification circuit, then the error code for Ri' (e.g., 0000) is loaded into the HDCP latch registers 475.

At 1260, the transmitter reads the HDCP latch registers of the receiver at a scheduled interval.

At 1255, if the Ri of the transmitter and the Ri' of the receiver match, the transmitter continues to transmit the audiovisual stream to the receiver.

At 1260, if the Ri and Ri' do not match (e.g., Ri' is set to the error code, such as 0000), the transmitter restarts verification of the receiver and restarts transmission of the audiovisual stream if the receiver remains a valid receiver.

When the transmitter reads the HDCP latch register of the receiver, the HDCP activity detector detects that the register is being read by the transmitter. The HDCP activity detector may then signal to the HDCP cipher circuit that the communication link between the transmitter and receiver is authenticated or not authenticated. If the communication link is authenticated, then the HDCP cipher circuit will generate private and public keys, where Mi' may be used by the HDCP decrypt circuit for decrypting the frames.

Examples

The following examples pertain to further embodiments.

Example 1 is a method comprising: receiving audiovisual frames by a data input port of an audiovisual receiver transmitted from an audiovisual transmitter; transition-minimized differential signaling (TMDS) decoding the audiovisual frames by a TMDS circuit of the audiovisual receiver; determining, by an active picture measure circuit of the audiovisual receiver, subsequent to TMDS decoding, if the active picture geometry of the successive ones the audiovisual frames is unchanged or changed; and signaling to the audiovisual transmitter by a data output port of the audiovisual receiver to reverify a validity of the audiovisual receiver and to restart transmission of the audiovisual frames from the audiovisual transmitter to the audiovisual receiver if the active picture geometry of the successive ones the audiovisual frames is changed.

Example 2 is a method of example 1, further comprising signaling to the audiovisual transmitter by the data output port of the audiovisual receiver to continue transmitting audiovisual frames to the audiovisual receiver if the active picture geometry of the successive ones the audiovisual frames is unchanged.

Example 3 is a method of example 2, wherein determining, by the active picture measure circuit subsequent to TMDS decoding, if the active picture geometry of the successive ones the audiovisual frames is unchanged or changed comprises: counting active video lines of successes ones of the audiovisual frames by an active picture measure circuit of the audiovisual receiver subsequent to TMDS decoding; counting pixels of the active video lines of the successes ones of the audiovisual frames by the active picture measure circuit subsequent to TMDS decoding; and determining by the active picture measure circuit if a number of the active video lines of the one of the successive frames are equal or unequal and if a number of pixels of the active video lines of the ones of the successive frames are equal or unequal.

Example 4 is a method of example 3, wherein signaling to the audiovisual transmitter by the audiovisual receiver to reverify a validity of the audiovisual receiver and to restart transmission of the audiovisual frames from the audiovisual transmitter to the audiovisual receiver if the numbers of the active video lines of successes ones of the audiovisual frames are changed and the numbers of the pixels of the active video lines of the successes ones of the audiovisual frames are changed.

Example 5 is a method of example 4, wherein signaling to the audiovisual transmitter by the data output port of the audiovisual receiver to continue transmitting audiovisual frames to the audiovisual receiver if the active picture geometry of the successive ones the audiovisual frames is unchanged comprises signaling to the audiovisual transmitter by the audiovisual receiver to continue transmitting audiovisual frames to the audiovisual receiver if numbers of the active video lines of successes ones of the audiovisual frames are unchanged and numbers of the pixels of the active video lines of the successes ones of the audiovisual frames are unchanged.

Example 6 is a method of example 5, wherein signaling to the audiovisual transmitter by the data output port of the audiovisual receiver to reverify the audiovisual receiver to restart transmission of the audiovisual frames from the audiovisual transmitter to the audiovisual receiver comprises storing an error code for a public key for one of the audiovisual frames in a buffer readable by the audiovisual transmitter.

Example 7 is a method of example 6, wherein signaling to the audiovisual transmitter to by the data output port of the audiovisual receiver to continue transmitting audiovisual frames to the audiovisual receiver if the active picture geometry of the successive ones the audiovisual frames is unchanged comprises storing the public key for one of the audiovisual frames in a buffer readable by the audiovisual transmitter.

Example 8 is a method of example 7, further comprising receiving the successes one of the audiovisual frames from the TMDS circuit by the active picture measure circuit.

Example 9 is a method of example 1, further comprising determining, by a high-bandwidth digital content protection (HDCP) control (CTL) detector and measure circuit of the audiovisual receiver, subsequent to TMDS decoding, if intervals between control (CTL) bits of the successive ones the audiovisual frames is unchanged or changed; and signaling to the audiovisual transmitter by the data output port of the audiovisual receiver to reverify a validity of the audiovisual receiver and to restart transmission of the audiovisual frames from the audiovisual transmitter to the audiovisual receiver if the intervals between the CTL bits of the successive ones the audiovisual frames is changed.

Example 10 is a method of example 9, further comprising signaling to the audiovisual transmitter by the data output port of the audiovisual receiver to continue transmitting audiovisual frames to the audiovisual receiver if the intervals between the CTL bits of the successive ones the audiovisual frames is unchanged.

Example 11 is a method of example 10, wherein signaling to the audiovisual transmitter by the data output port of the audiovisual receiver to reverify the audiovisual receiver to restart transmission of the audiovisual frames from the audiovisual transmitter to the audiovisual receiver comprises storing an error code for a public key for one of the audiovisual frames in a buffer readable by the audiovisual transmitter.

Example 12 is a method of example 11, wherein signaling to the audiovisual transmitter to by the data output port of the audiovisual receiver to continue transmitting audiovisual frames to the audiovisual receiver if the active picture geometry of the successive ones the audiovisual frames is unchanged comprises storing the public key for one of the audiovisual frames in a buffer readable by the audiovisual transmitter.

Example 13 is a method of example 12, further comprising receiving the successes one of the audiovisual frames from the TMDS circuit by the HDCP CTL detector and measure circuit.

Example 14 is a method comprising: receiving audiovisual frames by a data input port of an audiovisual receiver transmitted from an audiovisual transmitter; transition-minimized differential signaling (TMDS) decoding the audiovisual frames by a TMDS circuit of the audiovisual receiver; determining, by a high-bandwidth digital content protection (HDCP) control (CTL) detector and measure circuit of the audiovisual receiver, subsequent to TMDS decoding, if intervals between control (CTL) bits of the successive ones the audiovisual frames is unchanged or changed; and signaling to the audiovisual transmitter by the data output port of the audiovisual receiver to reverify a validity of the audiovisual receiver and to restart transmission of the audiovisual frames from the audiovisual transmitter to the audiovisual receiver if the intervals between the CTL bits of the successive ones the audiovisual frames is changed.

Example 15 is a method of example 14, further comprising signaling to the audiovisual transmitter by the data output port of the audiovisual receiver to continue transmitting audiovisual frames to the audiovisual receiver if the intervals between the CTL bits of the successive ones the audiovisual frames is unchanged.

Example 16 is a method of example 15, wherein signaling to the audiovisual transmitter by the data output port of the audiovisual receiver to reverify the audiovisual receiver to restart transmission of the audiovisual frames from the audiovisual transmitter to the audiovisual receiver comprises storing an error code for a public key for one of the audiovisual frames in a buffer readable by the audiovisual transmitter, and wherein signaling to the audiovisual transmitter to by the data output port of the audiovisual receiver to continue transmitting audiovisual frames to the audiovisual receiver if the active picture geometry of the successive ones the audiovisual frames is unchanged comprises storing the public key for one of the audiovisual frames in a buffer readable by the audiovisual transmitter.

Example 17 is a method of example 14, further comprising determining, by an active picture measure circuit of the audiovisual receiver, subsequent to TMDS decoding, if the active picture geometry of the successive ones the audiovisual frames is unchanged or changed; signaling to the audiovisual transmitter by a data output port of the audiovisual receiver to reverify a validity of the audiovisual receiver and to restart transmission of the audiovisual frames from the audiovisual transmitter to the audiovisual receiver if the active picture geometry of the successive ones the audiovisual frames is changed; and signaling to the audiovisual transmitter by the data output port of the audiovisual receiver to continue transmitting audiovisual frames to the audiovisual receiver if the active picture geometry of the successive ones the audiovisual frames is unchanged.

Example 18 is a method of example 17, wherein determining, by the link verification circuit subsequent to TMDS decoding, if the active picture geometry of the successive ones the audiovisual frames is unchanged or changed comprises: counting active video lines of successes ones of the audiovisual frames by an active picture measure circuit of the audiovisual receiver subsequent to TMDS decoding; counting pixels of the active video lines of the successes ones of the audiovisual frames by the active picture measure circuit subsequent to TMDS decoding; and determining by the active picture measure circuit if a number of the active video lines of the one of the successive frames are equal or unequal and if a number of pixels of the active video lines of the ones of the successive frames are equal or unequal, wherein signaling to the audiovisual transmitter by the audiovisual receiver to reverify a validity of the audiovisual receiver and to restart transmission of the audiovisual frames from the audiovisual transmitter to the audiovisual receiver if the numbers of the active video lines of successes ones of the audiovisual frames are changed and the numbers of the pixels of the active video lines of the successes ones of the audiovisual frames are changed, wherein signaling to the audiovisual transmitter by the data output port of the audiovisual receiver to continue transmitting audiovisual frames to the audiovisual receiver if the active picture geometry of the successive ones the audiovisual frames is unchanged comprises signaling to the audiovisual transmitter by the audiovisual receiver to continue transmitting audiovisual frames to the audiovisual receiver if numbers of the active video lines of successes ones of the audiovisual frames are unchanged and numbers of the pixels of the active video lines of the successes ones of the audiovisual frames are unchanged, wherein signaling to the audiovisual transmitter by the data output port of the audiovisual receiver to reverify the audiovisual receiver to restart transmission of the audiovisual frames from the audiovisual transmitter to the audiovisual receiver comprises storing an error code for a public key for one of the audiovisual frames in a buffer readable by the audiovisual transmitter, and wherein signaling to the audiovisual transmitter to by the data output port of the audiovisual receiver to continue transmitting audiovisual frames to the audiovisual receiver if the active picture geometry of the successive ones the audiovisual frames is unchanged comprises storing the public key for one of the audiovisual frames in a buffer readable by the audiovisual transmitter.

Example 19 is a circuit comprising: a data input port of an audiovisual receive to receive audiovisual frames from an audiovisual transmitter; transition-minimized differential signaling (TMDS) decoder of the audiovisual receiver coupled to the data input port to TMDS decode the audiovisual frames using a TMDS circuit of the audiovisual receiver; an active picture measure circuit of the audiovisual receiver coupled to the TMDS decoder to determine subsequent to TMDS decoding, if the active picture geometry of the successive ones the audiovisual frames is unchanged or changed; and a link verification circuit of the audiovisual receiver coupled to the active picture measure circuit to signal by a data output port of the audiovisual receiver to the audiovisual transmitter to reverify a validity of the audiovisual receiver and to restart transmission of the audiovisual frames from the audiovisual transmitter to the audiovisual receiver if the active picture geometry of the successive ones the audiovisual frames is changed.

Example 20 is a circuit of example 19, further comprising a high-bandwidth digital content protection (HDCP) control (CTL) detector of the receiver coupled to the TMDS decoder circuit to determine, subsequent to TMDS decoding, if intervals between control (CTL) bits of the successive ones the audiovisual frames is unchanged or changed, wherein the link verification circuit is to the signal to the audiovisual transmitter by the data output port of the audiovisual receiver to reverify a validity of the audiovisual receiver and to restart transmission of the audiovisual frames from the audiovisual transmitter to the audiovisual receiver if the intervals between the successive the CTL bits of successive one the audiovisual frames is changed.

This description has been presented for the purposes of illustration and description. It is not intended to be exhaustive or to limit the invention to the precise form described, and many modifications and variations are possible in light of the teaching above. The embodiments were chosen and described in order to best explain the principles of the embodiments and their practical applications. This description will enable others skilled in the art to best utilize and practice the invention in various embodiments and with various modifications as are suited to a particular use. The scope of the invention is defined by the following claims.

The invention claimed is:

1. A method comprising:
receiving audiovisual frames by a data input port of an audiovisual receiver transmitted from an audiovisual transmitter;
transition-minimized differential signaling (TMDS) decoding the audiovisual frames by a TMDS circuit of the audiovisual receiver;
determining, by an active picture measure circuit of the audiovisual receiver, subsequent to the TMDS decoding, if active picture geometry of successive ones of the audiovisual frames is unchanged or changed; and
signaling to the audiovisual transmitter by a data output port of the audiovisual receiver to reverify a validity of the audiovisual receiver and to restart transmission of the audiovisual frames from the audiovisual transmitter to the audiovisual receiver when the active picture geometry of the successive ones of the audiovisual frames is changed if an error code for a public key for one of the audiovisual frames is stored in a buffer readable by the audiovisual transmitter.

2. The method of claim 1, further comprising signaling to the audiovisual transmitter by the data output port of the audiovisual receiver to continue transmitting the audiovisual frames to the audiovisual receiver if the active picture geometry of the successive ones of the audiovisual frames is unchanged.

3. The method of claim 2, wherein determining, by the active picture measure circuit subsequent to the TMDS decoding, if the active picture geometry of the successive ones of the audiovisual frames is unchanged or changed comprises:
counting active video lines of the successive ones of the audiovisual frames by the active picture measure circuit of the audiovisual receiver subsequent to the TMDS decoding;
counting pixels of the active video lines of the successive ones of the audiovisual frames by the active picture measure circuit subsequent to the TMDS decoding; and
determining by the active picture measure circuit if a number of the active video lines of the successive ones of the audiovisual frames are equal or unequal and if a number of the pixels of the active video lines of the successive ones of the audiovisual frames are equal or unequal.

4. The method of claim 3, wherein signaling to the audiovisual transmitter by the data output port of the audiovisual receiver to reverify the validity of the audiovisual receiver and to restart the transmission of the audiovisual frames from the audiovisual transmitter to the audiovisual receiver when the active picture geometry of the successive ones of the audiovisual frames is changed further comprises signaling to the audiovisual transmitter by the audiovisual receiver to reverify the validity of the audiovisual receiver and to restart the transmission of the audiovisual frames from the audiovisual transmitter to the audiovisual receiver when the number of the active video lines of the successive ones of the audiovisual frames are changed and the number of the pixels of the active video lines of the successive ones of the audiovisual frames are changed.

5. The method of claim 4, wherein signaling to the audiovisual transmitter by the data output port of the audiovisual receiver to continue transmitting the audiovisual frames to the audiovisual receiver if the active picture geometry of the successive ones of the audiovisual frames is unchanged comprises signaling to the audiovisual transmitter by the audiovisual receiver to continue transmitting the audiovisual frames to the audiovisual receiver if the number of the active video lines of the successive ones of the audiovisual frames are unchanged and the number of the pixels of the active video lines of the successive ones of the audiovisual frames are unchanged.

6. The method of claim 5, wherein signaling to the audiovisual transmitter by the data output port of the audiovisual receiver to reverify the validity of the audiovisual receiver and to restart the transmission of the audiovisual frames from the audiovisual transmitter to the audiovisual receiver comprises storing the error code for the public key in the buffer.

7. The method of claim 5, wherein signaling to the audiovisual transmitter by the data output port of the audiovisual receiver to continue transmitting the audiovisual frames to the audiovisual receiver if the active picture geometry of the successive ones of the audiovisual frames is unchanged comprises storing the public key for one of the audiovisual frames in the buffer readable by the audiovisual transmitter.

8. The method of claim 7, further comprising receiving the successive ones of the audiovisual frames from the TMDS circuit by the active picture measure circuit.

9. A circuit comprising:
a data input port of an audiovisual receiver to receive audiovisual frames from an audiovisual transmitter;
a transition-minimized differential signaling (TMDS) decoder of the audiovisual receiver coupled to the data input port to TMDS decode the audiovisual frames using a TMDS circuit of the audiovisual receiver;
an active picture measure circuit of the audiovisual receiver coupled to the TMDS decoder to determine subsequent to TMDS decoding, if active picture geometry of successive ones of the audiovisual frames is unchanged or changed; and
a link verification circuit of the audiovisual receiver coupled to the active picture measure circuit to signal by a data output port of the audiovisual receiver to the audiovisual transmitter to reverify a validity of the audiovisual receiver and to restart transmission of the audiovisual frames from the audiovisual transmitter to the audiovisual receiver when the active picture geometry of the successive ones of the audiovisual frames is changed if an error code for a public key for one of the audiovisual frames is stored in a buffer readable by the audiovisual transmitter.

10. The circuit of claim 9, wherein the data output port of the audiovisual receiver signals to the audiovisual transmitter to continue transmitting the audiovisual frames to the audiovisual receiver when the active picture geometry of the successive ones of the audiovisual frames is unchanged.

11. The circuit of claim 10, wherein the active picture measure circuit counts active video lines of the successive ones of the audiovisual frames subsequent to the TMDS decoding.

12. The circuit of claim 11, wherein the active picture measure circuit counts pixels of the active video lines of the successive ones of the audiovisual frames subsequent to the TMDS decoding.

13. The circuit of claim 12, wherein the active picture measure circuit determines if a number of the active video lines of the successive ones of the audiovisual frames are equal or unequal and if a number of the pixels of the active video lines of the successive ones of the audiovisual frames are equal or unequal.

14. The circuit of claim 13, wherein the audiovisual receiver signals to the audiovisual transmitter to reverify the validity of the audiovisual receiver and to restart the transmission of the audiovisual frames from the audiovisual transmitter to the audiovisual receiver when the number of the active video lines of the successive ones of the audiovisual frames are changed and the number of the pixels of the active video lines of the successive ones of the audiovisual frames are changed.

15. The circuit of claim 9, wherein the buffer comprises registers.

16. The circuit of claim 15, wherein the audiovisual transmitter reads the registers at a scheduled interval.

17. The circuit of claim 15, wherein the active picture measure circuit applies a frame unlock signal to the link verification circuit if the active picture measure circuit determines that the audiovisual frames are unlocked.

18. The circuit of claim 17, wherein the error code is loaded into the registers if the active picture measure circuit applies the frame unlock signal to the link verification circuit.

19. The circuit of claim 9, wherein the active picture measure circuit applies a frame locked signal to the link verification circuit if the active picture measure circuit determines that the audiovisual frames are locked.

20. The circuit of claim 9, wherein the audiovisual receiver is in a configurable integrated circuit die.

* * * * *